C. D. FLYNT.

Improvement in Spring-Cushions.

No. 131,676.

Patented Sep. 24, 1872.

UNITED STATES PATENT OFFICE.

CHESTER D. FLYNT, OF NEW YORK, N. Y., ASSIGNOR OF ONE-HALF HIS RIGHT TO HENRY A. MOORE, OF SAME PLACE.

IMPROVEMENT IN SPRING-CUSHIONS.

Specification forming part of Letters Patent No. 131,676, dated September 24, 1872.

*To all whom it may concern:*

Be it known that I, CHESTER D. FLYNT, of the city, county and State of New York, have invented a new and useful Improvement in Spring-Cushion; and I do hereby declare the following to be a full, clear, and exact description thereof, which will enable those skilled in the art to make and use the same, reference being had to the accompanying drawing forming part of this specification, in which drawing—

Figure 1:
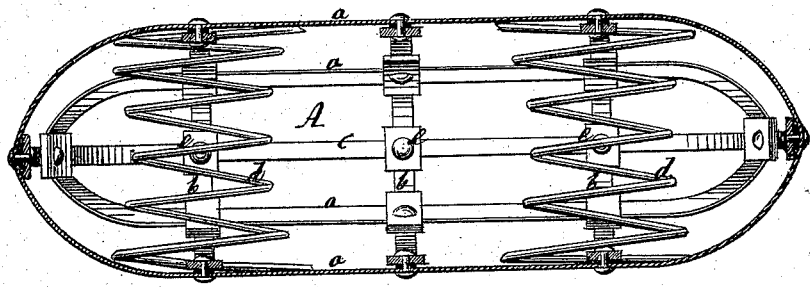
Figure 2:
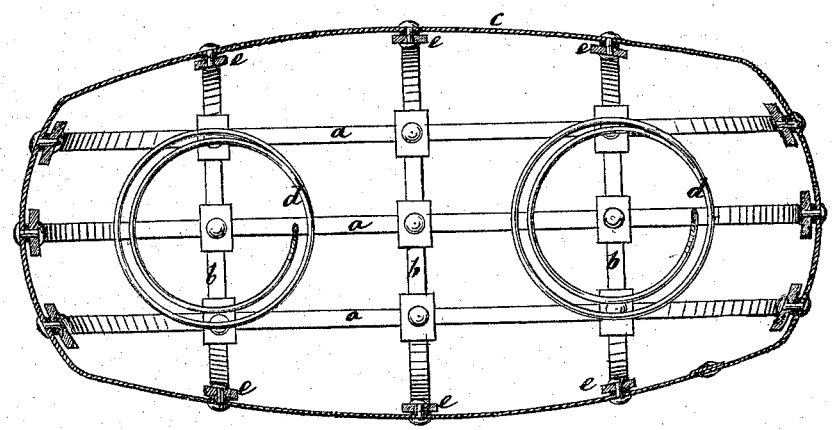

Figure 1 represents a longitudinal vertical section of this invention, and Fig. 2 is a horizontal section of the same.

Similar letters indicate corresponding parts.

This invention relates to a cushion which is constructed of thin strips of metal, steel being used by preference, the ends of which are fastened together so as to form elliptical rings of suitable size. A series of these rings are then combined and fastened together, some of said rings running in vertical planes and at right angles toward each other, and one or more of the rings running in horizontal planes. Between the vertical rings are placed coiled springs, and the joints between the various rings, particularly those between the horizontal ring or rings, and the vertical rings are strengthened and protected by detached pieces or continuous strips of India rubber or other flexible and elastic material.

In the drawing, the letter A designates a cushion, which is composed of a series of rings, $a\ b\ c$, made of strips of metal, rolled or otherwise produced for the purpose. The metal which I use by preference for this purpose is steel, which, after having been rolled to the required shape, is tempered and coated with tin or other protecting material. The rings $a$ run in a longitudinal direction parallel to each other in vertical planes, being kept at the proper distances apart by means of one or more horizontal rings, $c$, and by a series of vertical transverse rings, $b$. The transverse vertical rings are interwoven with the longitudinal vertical rings, and they are fastened together at their crossings by wire bands, or by any other suitable means. The horizontal ring $c$ is secured to the several vertical rings $a\ b$ by means of rivets, and the joints are protected and strengthened by supplemental springs $e$ of India rubber or other flexible and elastic material. These supplemental springs are either made detached, one for each separate joint as shown, or long strips may be used extending over two or more joints. Between the vertical springs $a\ b$, in the interior of the cushion, are secured coiled springs $d$, to increase the elasticity and the power of resistance of the whole. If this cushion is covered with some water-proof material it forms an effective life-preserver.

What I claim as new, and desire to secure by Letters Patent, is—

A cushion, composed of metallic rings $a\ b\ c$, and internal coiled springs $d$, arranged in relation to each other, substantially as shown and described.

This specification signed by me this 17th day of May, 1872.

C. D. FLYNT.

Witnesses:
W. HAUFF,
E. F. KASTENHUBER.